US008472462B2

(12) United States Patent (10) Patent No.: US 8,472,462 B2
Mignot et al. (45) Date of Patent: Jun. 25, 2013

(54) WIRELESS TRANSMISSION RATE CONTROL METHOD

(75) Inventors: Patrice Mignot, Paris (FR); Franck Geay, Acigne (FR); Pascal Le Guyadec, Paris (FR)

(73) Assignee: Thomson Licensing, Issy les Moulineaux (FR)

( * ) Notice: Subject to any disclaimer, the term of this patent is extended or adjusted under 35 U.S.C. 154(b) by 279 days.

(21) Appl. No.: 12/734,480

(22) PCT Filed: Nov. 4, 2008

(86) PCT No.: PCT/EP2008/064911
§ 371 (c)(1),
(2), (4) Date: May 4, 2010

(87) PCT Pub. No.: WO2009/059958
PCT Pub. Date: May 14, 2009

(65) Prior Publication Data
US 2010/0296466 A1 Nov. 25, 2010

(30) Foreign Application Priority Data
Nov. 9, 2007 (EP) .................................... 07301539

(51) Int. Cl.
*H04J 3/17* (2006.01)
(52) U.S. Cl.
USPC .......................................... 370/434; 370/464
(58) Field of Classification Search
USPC ................................................ 370/434, 464
See application file for complete search history.

(56) References Cited

U.S. PATENT DOCUMENTS 7,701,965 B2 * 4/2010 Ihori ............................. 370/464
2010/0040033 A1 * 2/2010 Xhafa et al. .................. 370/338

OTHER PUBLICATIONS

C-T Chou et al: "Achieving Per-Stream QoS Wit Distributed Airtime Allocation and Admission Control in IEEE 802.11E Wireless LANS" INFOCOM 2005. 24th Annual Joint Conference of the IEEE Computer and Communications Societies. Proceeding IEEE Miami, FL. USA, Mar. 13-17, 2005, USA, vol. 3, pp. 1584-1595.
Deyun Gao et al: "Admission control in IEEE 802.11e wireless LANs", IEEE Networks, IEEE Service Center, New York, USA, vol. 19, No. 4, Jul. 1, 2005, pp. 6-13.
A. Iera et al.: "Dynamic prioritization of multimedia flow for improving QoS and throughput in IEEE 802.11e WLANs" Communications, 2005, ICC 2005, IEEE International Conference on Seoul, Korea May 16-20, 2005, USA, vol. 2, pp. 1184-1189.
Search Report Dated Dec. 12, 2008.

* cited by examiner

*Primary Examiner* — Phuc Tran
(74) *Attorney, Agent, or Firm* — Tutunjian & Bitetto, P.C.

(57) ABSTRACT

The purpose of this invention is a method to provide a specific physical rate adapted to 802.11 WMM in EDCA mode which may be integrated as well in an Access Point as in a Station. The objective of this method is to select the 802.11 phyrate (physical rate) the most adapted for each WMM AC (Access category) of traffic requirements: For each AC it guaranties an IPLR (IP packet Lost ratio) specific physical rate and adapted to nature of the transported content. For BK (Background) and BE (Best Effort) it optimizes the used CUE (Channel Usage Estimation) in order to provide maximum bandwidth, For VI (Video) and VO (Voice) AC to guaranty first the delay bound (i.e. max IP Delay transmission (IPDT)) and when this condition is met it optimizes the used CUE.

8 Claims, 1 Drawing Sheet

---

Determining parameters specific for each access category and within an access category, AC, for each packet size Selecting a physical layer transmission rate for each access category and packet size

WIRELESS TRANSMISSION RATE CONTROL METHOD

This application claims the benefit, under 35 U.S.C. §365 of International Application PCT/EP2008/064911, filed Nov. 4, 2008, which was published in accordance with PCT Article 21(2) on May 14, 2009 in English and which claims the benefit of European patent application No. 07301539.8, filed Nov. 9, 2007.

BACKGROUND OF THE INVENTION

The invention relates to communication. More particularly, the present invention relates to a method to select a physical layer transmission rate or physical rate in a wireless communication system.

Wireless network is considered as the preferred network for home environment. The multimedia applications over wireless networks impose new challenges in networking efficient utilization of network bandwidth and computing resource where quality of service (QoS) requirement of video and audio is met.

The wireless network is composed per example of an access Points (AP) and a lot of station (STA) such as per example telephone, radio, Visio phone, television, computer, movie player. In this communication system signals are linked through a channel from a Station or an Access Point to a Station or an Access Point.

Wireless Multimedia Extensions (WME), also known as WiFi Multimedia, WMM) is a WiFi Alliance interoperability certification based on the IEEE 802.11e draft standard. It provides basic Quality of service (QoS) features to IEEE 802.11 networks. The traffic specification is defined in the 802.11e standard. It contains parameters that define the characteristic and the QoS expectation of traffic flow.

The first generation of WiFi Network i.e. 802.11b, was oriented for transport of best effort traffic i.e. mainly TCP transport.

The objective of the rate control algorithm (RCA) implemented within the station (STA) or access point (AP) is to provide the maximum of bandwidth: this implies to minimize the CUE (Channel Usage Estimation) used by each AP (Access Point) or STA (Station).

As highest phyrate (physical rate) usage decrease the transmission time but increase also the number of retransmission, the generation of algorithm tries to find the best compromise between the phyrate value and the "Retry Rate" value by methods specific to each algorithm. The "Retry Rate" is the way to measure retransmission, it is defined by the ratio for a population of N packet by: (Total number of retransmissions/N).

The difficulty comes from the fact that there are two origins of the retransmission difficulties:
The degradation of wireless condition increasing the BER (Bit Error Rate)
The collisions with packet coming from other APs and STAs. Trials show that the collision ratio is much more above the simulation ratio, due to mainly the performance and response time of wireless channel detection.

Unfortunately, at HW (Hardware level) level there is no practical way to identify the origin of a retransmission difficulty.

Consequently, there is also no way also to measure independently the Retry Rate due to collision (called Collision Retry Rate) and retry rate due to BER (called BER Retry Rate).

Furthermore, the collision detection is not possible for WiFi NWs

In order to optimize the transport over RTP (transport protocol) of real time media like Voice, interactive or non-interactive video, and associated signaling, the IEEE/WiFi Alliance has defined prioritization mechanism within WMM (WiFi manufacturer mode) which defines a contention channel access based on AC (Access Category). It has introduced four AC (Access Category) to improve the QoS on the wireless link: BK (Back ground) category, BE (Best Effort) Category, VI (Video) Category, VO (Voice) Category.

The WMM prioritization mechanism does not guaranty any value of QoS performance parameters; however trials show that taking account of WMM prioritization improves de facto, lot of the global behavior.

In the reality, the collision avoidance prioritization provided by the standard is limited:
The priority between AC is not absolute but relative: the collision ratio of each traffic flow is the result of collision probability with all other traffic flow reduced (i.e. multiply) by the collision probability of collision provided by the WMM collision avoidance mechanism.
The collision avoidance mechanism only work when several STAs or APs are waiting for a free channel. When the channel is already free, there is no collision avoidance mechanism between concurrent access.
The TXOP (Transmit Opportunity) mechanism increases the bandwidth performance by sending several packets during the same medium access, so it reduces the concurrent access probability but also increase the waiting delay for free medium.
Consequently, the collision avoidance mechanism works better for continuous transmission (typically bulk transfer) than sporadic or periodic transmission like voice or video media.

In the document "Bit-rate selection in wireless networks" from J. C. Bicket, an evaluation of bit-rate selection techniques to maximize throughput over wireless link is described. But this selection does not take account of WMM prioritization mechanism.

The existing Bandwidth oriented RCA algorithms providing a common phyrate to all ACs are functional in WMM environment, but are not adapted for this environment.

SUMMARY OF THE INVENTION

The objective of the invention is to provide some collision avoidance mechanism.

The invention consists in a method to select a physical rate to provide a maximum of bandwidth in a Wireless Multimedia (WMM) environment prioritizing transmission traffic from at least a station (STA) or an access point (AP) to at least a station (STA) or an access point (AP), different packet sizes corresponding to the nature of the transported content of a station (STA) or an access point (AP) and each access point (AP) being distinct with its own access category (AC). The invention is characterised in determining parameters specific for each access category (AC) and within an access category (AC) for each packet size range, and in selecting a physical rate using these parameters and corresponding to an access category (AC).

Preferentially, the parameters specific for each access category (AC) and within an access category (AC) are the specific values Multi-rate Retry Number (MRN) and Excessive Retry Number (ERN) of each AC.

Preferentially, the parameters specific for each access category (AC) are quality of service criteria (QoS) such as Packet Loss Ratio criteria (IPLR) and delay transmission criteria (IPDT).

The method furthermore consists in:
first, estimating the Packet Loss Ratio criteria (IPLR) and second the Delay Transmission criteria (IPDT) for each physical rate and for each access category; and estimating for each physical rate the Channel Usage Estimation (CUE) used by each AP or STA;
and selecting the physical rate corresponding to an optimisation of the estimated CUE and of the estimated IPDT for the maximum Packet Loss Ratio criteria (IPLR) which fulfils the AC requirements for the different packet sizes.

Preferentially, the selection is dynamic in order to change from one physical rate to another physical rate when the quality of service criteria (QoS) is changing.

An estimation of packet Lost Ratio (IPLR) is preferentially, based on the mathematic properties of an Erlang or an Exponential distribution model of tries number needed for the transmission of a packet within the same AC.

Preferentially, the measurement of the transmission delay of each packet (IPDT) is being defined with starting and ending conditions, the starting condition corresponding to the end of the filling up of the transmit buffer of the corresponding access category (AC) or station (STA) with a new packet to be transmitted, the ending condition corresponding to the reception of a transmission acknowledge.

Preferentially, the Quality criteria (QoS) for each Access Category (AC) are percentile measured.

Preferentially, an estimation of IP packet Delay Transmission (IPDT) percentile the mathematical properties of a Gamma distribution model of the IP packet Delay Transmission (IPDT) is used in which the main inputs are the packet Delay Transmission (IPDT) mean and the packet Delay Transmission (IPDT) variance of each packet.

Preferentially, the Packet Delay Transmission (IPDT) Percentile estimation is used as a warning for user applications out of range, out of the Quality criteria (QoS) or difficult transmission situation.

Preferentially, the IPLR estimation is used as a warning for the user or for application of out of range, out of Quality criteria (QoS) or difficult transmission situation.

Preferentially, the method can be implemented in an Access point or in a Station.

BRIEF DESCRIPTION OF THE DRAWINGS

Exemplary embodiments of the invention are described with reference to the accompanying drawings, in which.

DETAILED DESCRIPTION

Figure 1:
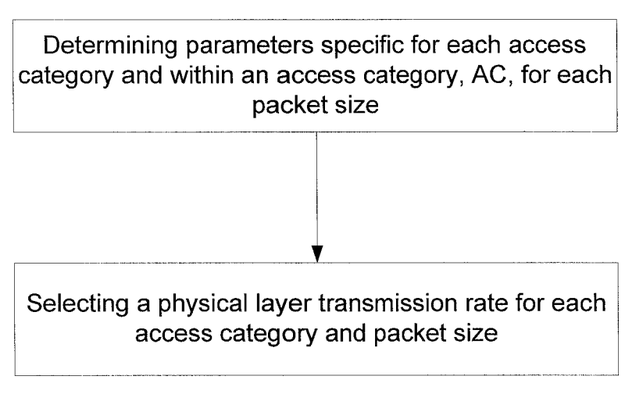
FIG. 1 is a flow diagram of the method for wireless transmission rate control according to an implementation of the invention.

The characteristics and advantages of the invention mentioned above, as well as others, will appear more clearly with the reading of following description and particularly the paragraph concerning:
Relationship between PER, Retry rate, Excessive Retry Number and IPLR and relative issues;
Retry Rate should be managed by AC;
Multi-rate parameters should be specific for each AC;
Issues to face in RCA WMM design;
Assertions regarding the interaction between CUE and IPDT;
Assertion regarding try number distribution model and impacts regarding the IPLR estimation;
Average instant measurement and average instant estimation tool box;
Relation between IPDT percentile and IPLR performances;
Packet size variation impact over IPLR, IPDT percentile estimation and Mean CUE measurement;
IPLR measurement, estimation and comparison;
IPDT Percentile measurement, estimation and comparison;
Impact of the phyrate sampling over the transmission performances;
Estimation and measurement of GIPLR and GIPDT;
Global IPLR and Global IPDT states and relative impacts on phyrate selection;
Relationship between the global and by phyrate performance evaluation and impact over statistic temporal window and sampling ratio;
Slow and fast Adaptive sampling management;
Selection of sampled phyrate;
Assertion regarding the impact of the multi-rate mechanism over measurement, evaluation and performance results;
Successive Packet Lost (SPL) management;
Starting phase of a RCA instance learning phase of a RCA instance;
Fast and slow adaptive phase of a RCA instance;
Summary of WiFi data and various information used by RCA WMM;
RCA WMM implementation profile examples for various device.
Furthermore a glossary is jointed to the description.

In WMM, each AC has its own set of parameters (AIFS, CWMIN, CWMAX and TXOP). So in order to have a more realistic CUE evaluation, this parameter set should be introduced in the CUE calculation and comparison between different phyrate. If not, the CUE calculation results may lead the RCA to a non-optimized selection of the current phyrate.

Even with these additional improvements, the Bandwidth oriented RCA algorithms remain not adapted for AC based transport model because the first objective of WMM AC model is not to provide the best bandwidth but to improve the QoS performance in accordance with the transported content, this means provide some kind of guaranty regarding Packet Lost Ratio and Delay Transmission.

The principle of Bandwidth oriented RCAs is to minimize the CUE (Channel Usage Estimation) consumed by each traffic flow.

In order to help the understanding the various issues provided by these approach, here is a simplified formula of calculation of CUE for a traffic flow of N frames by second with a common length:

$$CUE \% = N(1 + \text{Collision Retry} \% + \text{BER Retry} \%) \\ (\text{AIFS(AC)} + \text{Average CW(AC, Retry} \%) + \\ \text{POH} + 8(\text{MacHeader} + L)/\text{Phyrate}) + \text{SIFS} + \text{ACK}),$$

with:
CUE %: is the percentage of CUE used by a packet flow of N packets per second;
N is the number of packets per second;
Collision Retry % is the packet retry ratio due to collision;
BER Retry % is the packet retry ratio due to BER;
DIFS is the DIFS delay;
AIFS is the AIFS delay of this AC;

Average CW (AC,Retry %): is the average Contention Window. This value is dependant of the AC and also of the current retry rate;

Retry % is the total Packet Retry rate: Retry %=Collision Retry %+BER Retry %;

POH is the PHY overhead delay;

MacHeader: MAC Header byte number;

L is the packet length;

Phyrate is the current phyrate in bps;

SIFS is the SIFS delay;

ACK is the ACK delay;

Bandwidth oriented algorithm has to manage efficiently the specificities of each ACs.

Packet Sizes are More a Less Linked to AC:

The Packet size using VO or VI AC is normally quite homogenous, typical values are e.g.

172 bytes for voice media for G711 codec at 50 fps,
768 bytes for videophony,
1328 bytes for Standard TV The packet size BE and BK AC the packet size is not homogenous because all types of traffic may be found including file transfer, HTML pages, VoIP, V2IP, IPTV, various signaling protocols etc.

External perturbations increase the BER (accordingly with the current phyrate), the increasing BER will impact the Retry Rate. In a Gaussian model, PER (Packet Error rate) is given by:

$$PER=1-(1-Pb)^L \approx L \cdot Pb \text{ as long as } Pb \text{ is small.}$$

With:
Pb is the channel BER
L is the packet Length

Consequently, the same BER provide a lower Retry Rate for small packet than for large packet. Bandwidth oriented RCA are using different RCA instances for different packet ranges (e.g. 250B, 1600B, 3000B). But even with the same packet size, due to WMM collision avoidance mechanism, the collision Retry Rate is specific for each AC. Consequently, according with the previous CUE formula, a different retry rate, should lead the RCA to select a different phyrate for the same packet size on different AC.

AIFS and Backoff times are also specific to each AC. For small frame like VoIP, this time is independent of the phyrate but represents a significant part of the transmission delay. E.g. at 54 Mbps 29% of the CUE over the VO AC and 43% of the CUE over BE AC. Consequently, for the same packet size, depending of the retry rate, AIFS and back off times should lead also the RCA to select a different phyrate for the same packet size on different AC.

This means that:
The probability of collision between packets belonging to two different Access Category (AC) is much more lower that the probability of collision of two packet belonging to the same Access Category (AC).
Within an Access Category AC, the collision probability is linked mainly to the number of concurrent access to the medium.

And the WMM parameter values associated to each AC (i.e. AIFS, CWMIN, CWMAX, TXOP) is linked to the used CUE, etc.

In VoIP application, the bandwidth need for a G711 codec is around 80 Kbps (G729 is 44 Kbps), the transport protocol is over the VO AC, the frame size is 172 bytes at IP level and the frame period 20 ms, VO traffic.

Following the ITU recommendation G.1010 requirements for Voice media, the end-to-end delay for voice may not exceed 400 ms, and the target value should be 150 ms. As the target of 400 ms (and even more the 150 ms) is already difficult to reach and to guaranty, WiFi link should not be a significant degradation factor of this end-to-end delay.

Codec Adaptive Jitter buffer allows some delay variation (typically around 60 ms for VoIP). If the delay variation exceeds jitter buffer time, there is no practical difference for a Voice decoder between a lost packet and a too late packet. Conclusion, a max delay bound of 20 ms for the VO AC seems to be a reasonable objective to avoid a significant degradation of voice end-to-end delay.

The other G.1010 end to end Voice Media requirement, is the acceptable packet lost ratio which should be from 1% and 5% (depending of the codec type and packet lost cancellation associated mechanism) associated to the codec. Conclusion: the IPLR performance objective has to be bellow 0.5% for VO AC.

For videophony the typical bandwidth need for video is between 64 Kbps and 512 Kbps depending of the available bandwidth, the typical packet size is 700B and relative packet period between 87 ms and 10 ms. Following the ITU recommendation, the End to end delay must be close from 150 ms with an additional lip sink requirement of 80 ms and a packet lost bellow 1%. So the reasonable performance objective for the NW segment is a maximum delay bound of 80 ms and a packet loss ratio bellow 0.5%.

In IP TV application, the typical bandwidth is 6 Mbps, the typical packet size 1356B, the packet period is 1.77 ms. Following IYU recommendation the End to End delay is below 10 s (this delay seem too long regarding user feed back when TV channel is changed), the packet loss ration is bellow 0.1%.

As the VI AC is shared by videophony and IP-TV application, the QoS performance requirements for the VI AC are:
VI AC Max delay bound: 80 ms
VI AC Max IPLR: 0.05%

For BE and BK traffic like HTML, E-mail, Data bulk etc, there is no typical bandwidth, the packet size is variable, the used protocols may be either TCP or UDP based. In addition, each host (e.g. PC) may open several IP connections (typically in Web browsing application). Following ITU G.1010 requirement for HTML browsing, the end-to-end delay is between 2 s to 4 s per page the packet loss ratio is 0. Consequently There is no real Delay Bound performance for the WiFi segment for BE and BK AC There is a strong requirement regarding PLR for UDP packet but also for TCP packet: as WiFi retransmission delay is much more efficient that TCP or UDP retransmission. The PLR should be as low as possible and the requirement proposition is to have it bellow 0.01%.

In addition BE and BK CA should minimize CUE usage, in order to have a WiFi NW providing the best bandwidth for the BE and BK CA.

In the rest of the document, the max delay bound requirement of an AC is called Max IPDT and the maximum allowed packet lost of an AC is called Max IPLR.

For continuous media like voice or video, the max delay bound as only a meaning if it is reported to a packet population. So the max delay bound requirement has been changed in a IPDT percentile requirement for a very high percentile of the packet population e.g. upper than 99% for voice, 99.9 for video etc. . . .

Because the minimum transmission delay transmission of a packet over WiFi NW is equivalent to the physical transmission time for the first try (in typical configuration bellow 1 ms), the IPDV percentile value (IP Delay Variation for a percentile of population e.g. 99%, 99.5%, 99.9) is always bellow and close to the IPDT percentile value (of the same percentile of population). So in a first approximation IPDV percentile and IPDT percentile of a WiFi node may be considered as equivalent. Consequently, there are no needs and no real benefits to have specific requirement attached to IPDV percentile for WiFi NW.

In addition of IPLR, and IPDT percentile IPDV, real time media have bandwidth requirement which need to be considered in case of layer 2 admission and control (using DDTS and TSPEC procedure). To avoid congestion situation in the different transmit queues, the average transmission delay (or Mean IPDT) should be always bellow the packet period of the real time. E.g.:

For Voice media the Codec packet period is typically between 20 and 40 ms, and the IPDT percentile is 20 ms. This means that the IPDT percentile takes precedence over the Mean IPDT requirement.

For standard IPTV media, Video packet period is typically around 1, 75 ms and the IPDT percentile requirement is 80 ms. This means that Means IPDT percentile requirement takes precedence over IPDT percentile requirement.

Relationship Between Per, Retry Rate, Excessive Retry Number and IPLR And Relative Issues:

The packet error probability is equivalent to the PER (Packet Error Rate). A part of the PER is due to BER and is constant of each try, a part is due to collision and it is not the same for each try. However trials show that in a first approximation for a specific environment the PER may be considered as constant for all tries. This approximation fit well when the CW (Contention Window) is limited by the CW max of the AC (i.e second try for VI and VO AC and $8^{th}$ tries for BE AC). Considering that the relationship between the PER and the Retry Rate is the following:

$$TryRate - 1 = RetryRate = \sum_{try=1}^{try=\infty} PER^{(try)}$$

As PER should be bellow 1, the Retry Rate is a fast converging series which provide a max Retry rate value for typical values of PER.

In real implementation the number of tries is limited by the value of Excessive Retry Number (ERN) which defines the number of retries before dropping a packet (e.g. 8). In the current RCA implementation, this number is the same for all AC and all size of packet.

This means that for a specific ERN value and in order to satisfy the max IPLR AC requirement the Retry rate should satisfy the following condition: MaxIPLR<$PER^{ERN}$. This retry rate value is called Excessive Retry Rate (ERR) e.g. For a ERN of 8 and VO max IPLR of 0.5% the Retry Rate should not exceed 100%. This level of Retry Rate may seem very high but may be reached easily e.g. in long range or quick degradation or environment situation.

Consequently, in such situation a bandwidth oriented RCA which does not control the max retry rate may select a phyrate providing a better CUE, but with an IPLR not compatible with transported content.

As the PER value is directly linked to the packet size: PER=1−(1−Pb)$^L$≈LPb (see previous paragraph), in order to have a homogeneous behavior for one direction for all packet size the ERN may be configured differently for all packet size range: smaller packet may have smaller ERN values.

Thus, the ERN should be configurable per AC, and within an AC per packet size range.

And for each ERN value associated with an AC, the RCA should select a phyrate with a Retry Rate compatible with AC IPLR requirements.

And in its principle, as a bandwidth oriented RCA is not controlling the retry rate; it cannot guaranty any IPLR requirement, which is one of the main purposes of this invention.

Bandwidth Oriented RCA are not Adapted for the VoIP or V2IP Mobility:

Some devices used for VoIP or V2IP application are mobile device. In addition, of the previous performance requirements, one key performance of these mobile WiFi devices is the range. The range is not only linked to the HW performance, but also to the phyrate: lower phyrate are providing a better range.

The bandwidth oriented RCA will select a lower phyrate, only if the CUE increase due to a lower phyrate is compensated by a CUE usage decrease due to a lower Retry Rate. The CUE calculation shows that for a 9 MBps VoIP stream, the RCA needs an improvement of the Retry Rate of 35% to select to 6 Mbps phyrate.

If it considered that the Collision Retry Rate is e.g. around 15%, then the total Retry Rate is around 50%. With a 50% of retry rate, calculation show that the number of tries needed to transmit more than 99.9% of the packets is 6 tries. Trials show that the corresponding IPDT 99.9 (i.e. the maximum transmission delay for 99.9% of the packets) may be much above the target of 20 ms due to collision Retry Rate and Waiting Time for free channel. Such IPDT 99.9 and associated IPDV 99.9 (IP Delay variation for 99.9% of the traffic) which has the same value, can make non functional the transmission of voice over WiFi.

Conclusion

In its principle, a bandwidth-oriented RCA, may not guaranty any IPDT and IPDV requirement.

For service like fix mobile convergence, using voice over WiFi, this issue should be considered as the blocking problem that is the main purpose of this invention.

Retry Rate should be Managed by AC:

If the existing Bandwidth oriented RCA algorithms may be used with WMM AC, even if the phyrate selection take WMM parameter and packet size, these algorithms does not provide the best bandwidth optimization.

Simulation as real trials shows that in typical scenarios, the Retry Rates due to collision are specific for each direction, within a direction for each packet size and within a packet size for each AC, because the collision probability value is linked to WMM parameters value of each AC.

As the collision Retry Rate of packet with the same size is specific for each AC, and as the Retry rate is one the key factor is CUE measurement used in phyrate comparison and selection, a bandwidth oriented RCA will take some benefits to manage the phyrate not only by packet size range and but also by AC.

Multi-Rate Parameters should be Specific for Each AC:

In order to have chance to optimize the bandwidth, RCAs are producing CUE statistics for different packet size and different phyrates using sampling or probing mechanism. As these statistics require a significant number of packets before being reliable, the statistic result productions are de facto high latency compared to potential change of wireless condition.

In order to face to sudden degradation of wireless condition or an atypical packet size, which may lead to a packet dropping, RCA may implement a mechanism called usually Multi-rate. This mechanism forces a one packet temporary phyrate change based on the overrun of a Multirate Retry Number (MRN) and allows a packet dropping on the overrun of Excessive Retry Number (ERN):

The Multi-rate Retry Number defines the number maximum of successive retries at the same speed, before reducing the phyrate. (e.g. 4)

The Excessive Retry Number defines the number of retries before dropping a packet (e.g. 12).

In the current existing implementation of RCA, this two numbers are the same for all ACs.

Multi-rate mechanism has a real efficiency for reducing the IPLR, when main originator of the retries is the BER. When the main originator of retries is collision, multi-rate mechanism will add only some useless latency and a significant additional CUE consumption which amplifies the degradation of the situation. Because a Multi-rate mechanism is a blind mechanism, the real benefits of such a mechanism may be discussed especially for video stream where the use of lower phyrate have a high impact on the percent Global used CUE.

Trials show that in order to have some efficiency, the phyrate reduction must be drastic i.e. 2 bellow the current phyrate, even more, experiment show that in such situation the real improvement comes with non OFDM phyrate like 11 Mbps, 5.5 Mbps and that 12 Mbps, 9 Mbps, 6 Mbps OFDM phyrates may be skipped.

However, if the RCA implements this mechanism, there are some benefits to have specific values for Multi-rate Retry Number (MRN) and Excessive Retry Number (ERN) of each AC, e.g.

For Voice media considering that the IPDT 99.5 should be bellow 20 ms and the packet loss, bellow 0.5%, the RCA should have small the MRN in order to have a chance to be more reactive to wireless change condition and should reduce the ERN in order to avoid to send no more usable voice packet.

For video media considering that the IPDT 99.9 should be bellow 80 ms and packet loss bellow, 0.1%, and considering that if I there are is several Video concurrent streams (e.g. up and downstream) the collision probability is high, the MRN and ERN may be higher than for the VI AC than for VO class.

For BK of BE class considering that the IPDT 99.9 must be bellow 200 ms and packet lost ratio bellow 0.01%, the MRN and ERN may be higher than for the BE and BK AC than for VI AC.

This several examples show that:

Bandwidth oriented algorithm are not adapted for real time media transport over different ACs which need some guaranties regarding IPLR, IPDV percentile and IPDT percentile.

There are several performance benefits to manage the Phyrate specifically for each AC taking in account:

The specificity of this AC, mainly the WMM parameters, but also collision retry rate.

The content type transported within this AC and associated QoS requirements.

This is the main purpose of this invention.

Issues to Face in RCA4WMM Design:

The first difficulty for RCA4WMM comes from the fact that:

WiFi transmission are unstable and the BERR may change very suddenly and quite often The IP traffic is bursty, due to that the collision ratio may change very fast. The exception is the real time Media traffics, which are periodic and is requesting a permanent or a quasi permanent throughput.

WiFi IPLR percentile or IPDT percentile measurement criteria are high latency criteria and need a lot of packets (between 2000 and 20 000) before providing reliable results.

But there are also:

Some middle latency criteria: Mean retry rate, Mean CUE, mean IPDT, IPDT variance which may require a more limited number of packet and which may be used as input for the IPLR and IPDT percentile estimation.

Some low latency criteria or alarm:

Successive failed tries (used in Multi-rate mechanism).

Successive Lost packets.

So in the RCA, the low latency criteria define the current performance of the system. The current performances define the objectives to perform e.g. improve the IPDT or improve the CUE. Middle latency criteria give the measurements need to select the actions to perform in order to reach the objective. And alarm act as fireman.

The second difficulty of any adaptive RCA is the necessity to first evaluate and measure the wireless environment before being operational. For that, each RCA instance is using several phases:

The Starting phase: this phase is corresponding to the definition of the default condition and the initialization of statistic mechanism.

The Learning phase this phase is corresponding to the period needed to obtain some measurement of the environment e.g. mean Retry rate, mean IPDT, IPDT variance or mean CUE of various phyrate. The learning phase duration is dependant of the number of sample needed to produce a first bunch of valid statistics.

The Adaptive phase: this phase is corresponding to stable period where the Phyrate selection is leaded by low, high and middle latency criteria.

Assertions Regarding the Interaction Between Cue and IPDT:

In order to understand the next paragraphs, some assertions need to be provided regarding the relation ship between the IPTD (IP Transmission Delay) and the CUE optimization mechanism.

The CUE is the medium time ratio needed for a transmission of one frame. CUE optimization mechanism consists in the selection and use of the phyrate which provides the lower mean CUE. The RCA change the phyrate when it has found a better compromise between transmission rate and Retry Rate, in this situation:

When the RCA increases the phyrate:

The average Retry Rate due to BER will increase.

The mean transmission delay per packet will decrease (of CUE improvement value)

The average Retry Rate due to collision as the average waiting delay will normally decrease because other STA or AP will take benefit of the freed CUE. But as this gain of few % of CUE is shared between all NW Station and Access Point, there is no significant impacts over collision retry rate or average waiting time.

When RCA decreases the phyrate:

The average Retry Rate due to BER will decrease

The transmission delay per packet will decrease (of the CUE improvement value)

The average Retry Rate due to collision and the average waiting delay will normally decrease because other STA or AP will take benefit of the freed CUE. But as this gain of few % of CUE is shared between all participants, there is no significant impacts over collision retry rate or average waiting time.

The transmission delay of an IP packet (IPDT) is:

$$IPDT = \sum_{try=1}^{try=n} (WaitingTimefromFreeMedium + CUE(Phyrate, CW))$$

In this formula WaitingTimeForFreeMedium is fully dependant of the overall traffic of others Station or Access Point of this WiFi Nw and depending of neighbor WiFi NWs. Various trials show in real environment that:
  The WaitingTimeForFreeMedium value may overcome the transmission value (CUE (phyrate, Try) in perturbed environment even if there no apparent traffic.
  The value of WaitingTimeForFreeMedium is linked to the AC and associated WMM parameters values.
  The variation of WaitingTimeForFreeMedium delay may contribute e.g. up to 80% of the max IPDT value.
  The impact of mean WaitingTimeForFreeMedium over the IPDT value is more or less proportional to the number of tries, even if individual waiting time may exceed several times the mean WaitingTimeForFreeMedium.
  The probability of transmission failure (or success) may be considered in first approximation as quasi constant, as it was explained before.

Considering that a RCA is acting a phyrates change only if the new phyrate will provide a lower (or equal) CUE for this AC: the WaitingTimeForFreeMedium for each individual try does not evolve significantly on a phyrate change as explain before.

Consequently, on a phyrate change for a better CUE, the impact on the IPDT formula value will be the following:
  The term CUE (phyrate, CW) will follow the evolution of CUE and will be lower.
  If the Phyrate is lower, the term:

$$\sum_{try=1}^{try=n} (WaitingTimefromFreeMedium)$$

will be lower because the number of retry due to BER is lower and consequently the IPDT percentile (e.g. 99%) will be also improved
  If the Phyrate is higher, the term:

$$\sum_{try=1}^{try=n} (WaitingTimefromFreeMedium)$$

will be higher because the number of retry due to BER will be higher and consequently the IPDT percentile evolution is not really predictable because CUE improvement may or may not compensated the evolution of the increase of the $$\sum_{try=1}^{try=n} (WaitingTimefromFreeMedium)$$

It can be also demonstrated also that a selection of a lower phyrate which is degrading the CUE, (because the number of retry due to BER is not significantly lower), may or not degrading the IPDT, depending of the evolution of the term of $$\left. \sum_{try=1}^{try=n} (WaitingTimefromFreeMedium) \right).$$

Conclusion, even when the CUE is improved, the impact a phyrate change over the IPDT is not always predictable so the only reliable solution to know the impact of phyrate over the IPDT is to measure it.

Assertion Regarding Try Number Distribution Model and Impacts Regarding the IPLR Estimation:
  Trial show that try number distribution model may be assimilated either to Erlang distribution or an exponential distribution model. For an exponential distribution model:
    Lambda is given by the Mean tries rate $\mu = 1/\lambda$.
    the cumulative distribution is given by $F(x) = 1 - e^{-\lambda x}$ or $F(x) = 1 - e^{-x/\mu}$
  Knowing the max number of tries is given by the ERN (e.g. 8) of the RCA and the max IPLR (e.g 0.5%), the ERN should satisfy the following requirement:

$$(1 - \max IPLR) \leq F(ERN) = 1 - e^{-ERN/\mu}$$

or $$(\max IPLR) \geq \frac{1}{e^{ERN/\mu}} \text{ or }$$

$$\left( e^{ERN/\mu} \geq \frac{1}{\max IPLR} \text{ or } -\ln(\max IPLR) \leq \frac{ERN}{\mu} \right.$$

or $$\mu = MeanTryRate = 1 + MeanRetryRate \leq -\frac{ERN}{\ln(\max IPLR)}$$

The RCA by measuring and controlling or the mean try rate (or mean retry rate) is able also to control the IPLR of a transmission.

The main input used for IPLR estimation based on exponential distribution is the mean retry rate measurement. To provide a reliable result, this mean retry rate measurement needs much more less samples (e.g. around 200 sample for and IPLR of 1%) compared to a direct measurement of IPLR (e.g. the measurement of an IPLR of 1% may require at least 5000 sample).

Use IPLR estimation based or Exponential distribution model properties allows the RCA to be much more reactive to IPLR variation.

Assertion Regarding IPDT Distribution Model and Impact Over the RCA:
  Trial show that IPDT distribution model may be assimilated either to a Gamma distribution.
  For a Gamma distribution model:
  Gamma dist:

$$G(x; k, \lambda) = x^{k-1} \frac{\lambda^k e^{-\lambda x}}{\Gamma(k)}$$

with $\Gamma(k)$ is the Gamma function $$\Gamma(k) = \int_0^\infty t^{k-1} e^{-t} dt$$

k and lambda are given by the Mean and the Variance of delay packet $$k = \frac{Mean^2}{Variance} \text{ and } \lambda = \frac{Mean}{Variance}$$

the cumulative distribution is given by $$Gcumul(x; k, \lambda) = 1 - \frac{\Gamma(k, \lambda x)}{\Gamma(k)}$$

with $\Gamma(k,x)$ is the upper incomplete Gamma function:

$$\Gamma(k, x) = \int_x^\infty t^{k-1} e^{-t} dt$$

The function F(x) that gives the % of packets which IPDT is superior to x value could be represented by:

$$F(x) = 1 - Gcumul(x; k, \lambda) = \frac{\Gamma(k, \lambda x)}{\Gamma(k)}$$

After many simplifications, this equation is equivalent to:
For $0<k<1$: $\ln(F(x)) \approx -\lambda x - \ln(\Gamma(k))$
For $k>1$:

$$\ln(F(x)) \approx -\lambda x + \ln\left(1 + \frac{(\lambda x)^{k-1}}{\Gamma(k)}\left(1 + \frac{k-1}{\lambda x}\right)\right)$$

According to these equations, the value $IPDT_{Percent}$ represents the IPDT percentile and Percent represents the percentile (e.g. 99% or 99.9%). $IPDT_{Percent}$ can be estimated by using the following series:
For $0<k<1$:

$$IPDT_{percent} \approx \left(-\ln(1 - \text{Percent}) - \ln(\Gamma(k))\right)\frac{1}{\lambda}$$

For $k>1$:

$$IPDTP_{Percent} \approx$$
$$\left(-\ln(1 - \text{Percent}) + \ln\left(1 + \frac{(\lambda \cdot IPDT_{Percent})^{k-1}}{\Gamma(k)}\left(1 + \frac{k-1}{\lambda \cdot IPDT_{Percent}}\right)\right)\right)\frac{1}{\lambda}$$

The main input used for IPDT percentile estimation based on Gamma distribution is the mean IPDT and the IPDT variance measurement. In order to provide a reliable result, this mean retry rate estimation request much more less samples (e.g. around 200 sample for and IPDT of 99%) compared to a direct measurement of IPDT (e.g. the measurement of an IPDT 99 may require at least 5000 sample).

Use IPDT percentile estimation based or Gamma distribution model properties allows the RCA to be much more reactive to IPDT percentile variation.

Average Instant Measurement and Average Instant Estimation Tool Box:

First the difference in the document between transmission parameter measurements, estimation, evaluation, value needs to be clarified:

The term "measurement" is used when a physical transmission parameter value are really measure e.g. means IPDT means CUE, Tries number, IPDT percentile, IPLR may be measured. To obtain a valid measurement of transmission parameter, some of them like mean IPDT or Means CUE require a limited number of samples, some others like IPLR or IPDT percentile require a lot of samples.

The term "estimation" is used when the mathematical distribution properties are used to estimate transmission parameter value using a limited number of samples: typically IPDT percentile and IPLR percentile are estimated. For an equivalent number of sample, the result of an estimation are de facto more accurate that a real measurement, when the sample population follow the distribution model but less reliable in the opposite situation.

The term "evaluation" is used when the usage of measurement or evaluation does not need to be differentiated in this level of the description of the RCA.

The term "value" is used to identify the result of a transmission parameter measurement or estimation.

The toolbox used by RCA4WMM includes several sub systems:
  IPLR estimation (or measurement)
  IPDT percentile estimation (or measurement)
  Try number and mean Try Number measurement used for IPLR estimation and CUE estimation
  IPDT, Mean IPDT and IPDT variance measurement used for the IPDT percentile estimation All this average measurements or estimation may several methods including:
  SMA (Sliding Moving Average). The main drawback of this method is to oblige to store each sample of the sliding window,
  Successive Cumulative Average method. The window size is the same than previous one. The main draw back of this method is to request a samples number equivalent to the window size before to be able to provide a new average value
  EMA (Exponential Moving Average) and MEMA (Multiple EMA) method.

The EMA formula EMA $(n)=(S(n)*a)+(EMA(n-1)*(1-a)$ where:
  S(n) is the last sample value.
  The smoothing factor is $a=2/(1+N)$ where N is the number of sample period.

Compared to SMA, the main benefit EMA does not need to store all samples, the main draw back is to be to have exponential load, which give to much load to the most recent data. In order to correct this effect ant to spread the load, Multiple EMA (MEMA) may be used. The principle is to use the output of the first EMA as input of second EMA, then to use output of this second EMA as input in a third EMA and so on. All these EMA have the same smoothing factor. In the rest of the document, we call MEMA factor the number of successive MEMA used to produce a measurement or an estimation value.

In order to compare consistently IPLR, IPDT percentile or mean CUE over an equivalent temporal window, the smoothing factor and the MEMA factor (i.e. number of successive EMA) should be common e.g. for Mean Retry rate, Mean IPDT or IPDT variance.

In order to avoid too much distortion in intermediate and final EMA results, there is some interest to initialize EMA or MEMA with a value reflecting the current value (if known) or a realistic value.

Relation Between Ipdt Percentile and Iplr Performances:
IPDT percentile and IPLR are linked trough the Excessive Retry Number: a too low value of this number will provide an excellent value of IPDT percentile (due to a too limited number of tries) but a too high IPLR for the same reason.

Therefore, the idea is to always consider together IPLR and IPDT percentile measurement or estimation. For a RCA instance corresponding to an AC and a packet range, IPDT percentile performance value may is valid only if the associated IPLR performance fulfills the AC IPLR requirement.

This explains why in the AC hierarchy requirements, the IPLR requirement comes before the IPDT percentile requirement.

Packet Size Variation Impact Over IPLR, IPDT Percentile Estimation and Mean CUE Measurement:

One of the RCA complexities comes from the fact that all the packets have not the same size as explained before
  The packet size has a direct impact PER and consequently on the mean retry rate.
  The mean retry rate is with ERN the main inputs used for the estimation of IPLR.
  The packet size and the mean retry rate are the main inputs used for the measurement of mean CUE.
  The IPDT percentile is also impacted because the IPDT value of each packet is linked to the packet size and to the number tries.

The comparison between mean IPLR, IPDT Percentile and CUE of different phyrates is based on the assertion that the packet size distribution (within an AC and within a packet size category) is similar for sampled and nominal phyrates.

Consequently, packet number of SMA or the smoothing factor of EMA and or MEMA should be correctly dimensioned. This value may change from one AC to another due to the specific nature of the traffic of each AC IPLR Measurement, Estimation and Comparison:

To select the best phyrate, the RCA need to have an evaluation of the impact of the candidate phyrate over the IPLR. To compare IPLR, several possible implementations may be used with different level of complexity, requiring different number of samples providing various reliability and reactivity:
  IPLR measurement. As explain before this method is reliable but requires a lot of packet to provide a valid measurement and consequently does not provide a sufficient reactivity in case of low bandwidth traffic like VoIP.
  IPLR estimation based on the properties Exponential distribution. As explained before this estimation if it less reliable than the previous one but provide the needed reactivity including for low bandwidth media like VoIP. In addition this method allows the RCA to discard any phyrate with a IPLR percentile outside the AC requirements.

As already explained in a previous paragraph, the properties of Exponential distribution model, gives a direct relationship between max IPLR requirement and mean retry rate:

$$MeanRetryRate \leq -\left(1 + \frac{ERN}{\ln(\text{max}IPLR)}\right)$$

This means:
  For a specific phyrate or globally, the Mean Retry Rate cannot exceed a known value in order to fulfill max IPLR requirement of this AC.
  That the IPLR of various phyrate may be compared using their Mean Retry Rate.

IPDT Percentile Measurement, Estimation and Comparison:

To select the best phyrate, the RCA need to know the impact of the candidate phyrate over the IPDT percentile. To compare IPDT percentile, several possible implementations may be used with different level of complexity, requiring different number of samples with different reliability and reactivity:
  IPDT measurement. As explain before this method is reliable but requires a lot of packet to provide a valid measurement and consequently does not provide a sufficient reactivity.
  Mean IPDT. Linked with the distribution model, the mean IPDT variation follows (but amplifies) mean CUE variation, due to this fact it should not be consider as a good indicator for IPDT percentile.
  Mean IPDT+IPDT standard deviation: this indicator is much more relevant than the previous one, but it is not able to reflect the variation of high percentile of packets such as 99.9%.
  IPDT percentile estimation based on the properties of a Gamma distribution. As explained before this estimation if it less reliable than a real measurement but provide the needed reactivity for low bandwidth media like VoIP. In addition this method allows the RCA to discard any phyrate with a IPDT percentile outside the AC requirements.

Impact of the Phyrate Sampling Over the Transmission Performances:

In order to have a chance to be able to improve IPLR, IPDT or CUE and the IPDT, the other phyrate than the current phyrate should be sampled for IPLR, IPDT and CUE performance estimation or measurement.

The alternative to phyrate sampling method is the phyrate probing method. For measuring the IPLR, IPDT and CUE performances of various phyrates, the probing method is using out of band fake packets and not in band real packets as the sampling method. If phyrate probing avoids bringing any additional perturbation in the real traffic, phyrate-probing packets may increase significantly the used CUE of each flow (e.g. more a less 10%). Probing impact over CUE may be a real disaster when there are inside a WiFi NW a lot of low bandwidth streams like VoIP, which requires a probing which may reach e.g. 66% of the real stream. If the probing method is fully compatible with the invention to compare various phyrate, the remaining RCA4WMM description will only use the sampling method, which seems more appropriated with CUE performance objective of this RCA.

In existing RCA implementation a typical value for the phyrate sampling ratio is 10% of the packet population or two times 5% if two phyrates are sampled together. This 10% of packets are using a phyrate which may have worst (or better) IPLR and IPDT percentile performance than the nominal phyrate. As IPLR and IPDT percentile performance are defined by the loss or the excessive IPDT of less than 1% of the packet population, phyrate sampling may have dramatic impact over global transmission performance.

Consequently:
  The RCA instance should verify that all transmitted packets using either sampled or nominal phyrate fulfills the AC performance requirements. These global performance estimations are called Global IPLR (GIPLR) and Global IPDT (GIPDT) estimation (or measurement).
  The RCA instance should provide IPLR, IPDT percentile and Mean CUE evaluations for each nominal or sampled phyrate in order to be able compare the phyrate performances and potentially select a new nominal phyrate in order to improve the global performance.

Estimation and Measurement of GIPLR and GIPDT:

Regarding the Global IPLR evaluation, the estimation method should be preferred. However as all transmitted packets are used for the evaluation, the measurement method may be considered at least for high bandwidth application like IPTV.

The estimation of the GIPLR is given by:

$$GIPLR = \sum_{1}^{n_n} TrafficRatio_n \times IPLR_n$$

where:
1 to n identified each of the sampled and nominal phyrates in use for the current RCA instance
TrafficRatio$_n$ represent the percentage of traffic transmitted by this phyrate $$IPLR_n = \frac{1}{e^{ERN/MeanTryRate}n}$$

as explain in a previous paragraph

Regarding the Global IPDT percentile evaluation, the estimation method should be preferred. However as all packets are used for the evaluation, the measurement method may be considered at least for high bandwidth application like IPTV.

The estimation of the GIPDT is given by:

$$GIPDT_{Percent} = \sum_{1}^{n_n} TrafficRatio_n \times IPDT_n$$

where:
1 to n identified each of the sampled and nominal phyrates in use for the current RCA instance
TrafficRatio$_n$ represent the percentage of traffic transmitted by this phyrate
IPDT$_n$ is the GIPDT$_{Percent}$ of phyrate n. As explain in a previous paragraph GIPDT$_{percent}$ of is given by the series:

For 0<k<1 by:

$$IPDT_{percent} \approx \left(-\ln(1 - Percent) - \ln(\Gamma(k))\right)\frac{1}{\lambda}$$

For k>1 by:

$$IPDTP_{Percent} \approx$$

$$\left(-\ln(1 - Percent) + \ln\left(1 + \frac{(\lambda \cdot IPDT_{Percent})^{k-1}}{\Gamma(k)}\left(1 + \frac{k-1}{\lambda \cdot IPDT_{Percent}}\right)\right)\right)\frac{1}{\lambda}$$

Another way to guaranty the GIPLR and GIPDT requirement is to verify that each sampled or nominal phyrate fulfill the max IPLR and Max IPDT requirements. In this situation:
If the IPLR or the IPDT of sampled phyrate is bellow the performance requirement the sampling for this phyrate may be suspend in order to not to degrade more the global performance.
If the IPLR and/or the IPDT of nominal phyrate is bellow the performance requirement, the phyrate change may be anticipated before the global IPLR and/or IPDT performance evaluation will be over the Max IPLR and/or Max IPDT performance.

In this mode, in order to avoid too conservative IPLR performance, as long as GIPLR are satisfying the global requirement:

$$GIPLR_{Percent} = \sum_{1}^{n_n} TrafficRatio_n \times IPLR_n \leq maxGIPLR,$$

the max IPLR target may be different for sampled and nominal phyrate, e.g. the max IPLR of the highest sampled phyrate may be higher than max GIPLR and Max IPLR of the nominal phyrate IPLR may be lower tan the max IPLR.

In this mode, in order to avoid too conservative IPLR performance, as long as GIPLR are satisfying the global requirement $$GIPDT_{Percent} = \sum_{1}^{n_n} TrafficRatio_n \times IPDT_n \leq maxIPDT$$

the max IPDT target may be different for sampled and nominal phyrate, e.g. the max IPDT of the highest sampled phyrate may be higher than max GIPDT and Max IPDT of the nominal phyrate IPDT may be lower tan the max IPDT.

Global IPLR and Global IPDT States and Relative Impacts on Phyrate Selection:

As already said, all transmitted packets data are used to provide GIPLR and GIPDT. Consequently, each RCA instance should consider that the global IPLR and IPDT evaluation are providing a reliable state of the transmission.

The RCA should identify the following GIPLR and GIPDT states:
Bad IPLR state: the GIPLR value is above max IPLR.
Bad IPDT state: the GIPLR is below the max IPLR, but the GIPDT is above the Max IPDT.
Good IPDT state: the GIPLR and GIPDT are both below the max IPLR and max IPDT.

The RCA should manage the phyrate selection in relation GIPLR and GIPDT current states and accordingly with the performance criteria priority: IPLR, IPDT percentile and CUE:
In Bad IPLR state, the RCA will select nominal and sampled phyrates which will improve the IPLR i.e. a lower phyrate.
In Bad IPDT state the RCA will select nominal and sampled phyrate which will improve the IPDT but with an IPLR estimation compatible with max IPLR requirement.
In Good IPDT state the RCA will select nominal and sampled phyrate which will improve the CUE but with a IPLR and IPDT estimation compatible max IPLR and max IPDT requirement.

Relationship Between the Global and by Phyrate Performance Evaluation and Impact Over Statistic Temporal Window and Sampling Ratio:

In order to have a consistent and valid comparison between IPLR, IPDT percentile and CUE performances of sampled and nominal phyrate, the various SMA, EMA (or MEMA) used for the evaluation IPLR, IPDT and CUE should be fed ideally by the same number of packets data belonging all to the same temporal window with the same weighting. For EMA and MEMA, this implies to use the same smoothing factor and same EMA factor.

In addition, in order to avoid inconsistent evaluation and take consistent decision, the temporal window used for global performance evaluation and for phyrate performance evaluation should be ideally the same. For EMA and MEMA this imply to used different smoothing factor global mea and phyrate evaluation in relation with the sampling ratio e.g if the sampling ratio is 1/20 and global smoothing factor is 1% the sampling smoothing factor is 17.2. A rough approximation of the ideal sampling smoothing factor may be provided by using the following formula:

Sampling smoothing factor=Global smoothing factor/sampling ratio

But, even with all these precautions, as sampling evaluations are using a small fraction of transmitted packet (e.g.

5%), sampling evaluations are de facto much more less reliable than global IPLR or IPDT percentile evaluation which are using all transmitted packet measurements. Due to that, some inconsistencies and contradictions may appear between the evaluations results done at global level and at phyrate sampling level. In all these situations, the RCA should consider first global evaluation. A way to reduce these error is to use to evaluate nominal phyrate performance, the measurements of all packet transmitted at nominal phyrate, but with a specific sampling smoothing factor (roughly 10% higher than to the global smoothing factor) in order to cover the same temporal window that the sampled phyrates:

Nominal smoothing factor=Global smoothing factor)/
(1−Number of sampled phyrate×sampling ratio)

In addition, in order to improve reactivity in case of changing wireless environment or mobility it may be more convenient to have shorter temporal window for global IPLR and IPDT percentile evaluation.

Slow and Fast Adaptive Sampling Management:

The Phyrate Sampling Rate (PSR) is the rate used to measure the performance (e.g. CUE, Mean IPDT, Retry Rate . . . ) of nominal and sampled phyrate. The sampling rate selection is a compromise between fast adaptation delay on one side and reliability in IPLR IPDT and CUE evaluation on the other side.

High sampling rate is used to obtain quickly measurement result and consequently to adapt quickly the phyrate according to the various evolution of the environment. Quick adaptation is mandatory in case of mobility or when starting a transmission;

Low sampling rate with a high usage of the nominal phyrate is used to optimize the transmission performance (IPLR, IPDT and CUE), in this mode the RCA adaptation is less reactive than in the previous mode.

In order to avoid a difficult compromise, the idea is define two modes of adaptation:

A fast adaptation mode is used when a traffic is starting or re-starting or in case of bad situation. In fast adaptation mode the RCA objective is to identify the phyrate providing the best performance as fast as possible.

A slow adaptation mode is used when the RCA know the best phyrate to use. In slow adaptation mode the RCA objective is to provide the optimum IPLR, IPDT or/and CUE global performance.

In order to have a consistent approach of the behavior during the fast or slow adaptation mode, the idea is to specify for each the phyrate adaptation requirements:

To specify the Phyrate Slow Adaptation Period (PSAP) requirement in normal mode each AC (e.g. 1.5 s for V0 and 1.5 s VI class, 3 s for BE or BK class). The PSAP defines the targeted delay for a phyrate potential change and consequently the phyrate adaptation speed.

To have a Phyrate Adaptive Sampling Period (PASP) that satisfies the previous requirement. As the sampling period is used to measure nominal and sampled phyrates. The PASP could not be lower than the current Mean Inter-departure packet Period (MIPP) that defines the de facto maximum available sampling period.

To specify Phyrate Fast Adaptation Iteration (PFAI), this value defines the number of remaining iterations of phyrate change to perform in order to have a RCA closed to the optimum adaptation. The PFAI counter is initiated or re initiated at each traffic starting for this AC, and decremented a each phyrate change. As long as the PFAI is not equal to 0, the system remains in fast adaptation mode and use the current the MIPP as PASP.

The PSAP and PFAI initial values are specific to each AC. The Phyrate Adaptive Sampling Period (PASP) is given by:
During Phyrate Fast Adaptation Mode (i.e. PFAI≠0) by:
PASP=MIPP
PASP=MIPP
During Phyrate Slow Adaptation Mode (i.e. PFAI=0) by $$PASP = \frac{PSAP}{N \cdot n}$$

with:
PSAP Phyrate change period for measurement of nominal phyrate and sampled phyrate)
n the number of measured phyrate (e.g. 3 for 2 sampled and 1 nominal)
N define the Number of packet per needed for the by the various EMA or MEMA to provide a valid measurement or estimation. For a EMA or a MEMA, this is the number of sample needed to give a cumulative weighing >80%, e.g. 17 samples for a triple EMA with a smoothing factor of 0, 2 17.
PAPSP should not be higher than the current Mean Inter-departure Packet Period (MIPP), if it is PASP=MIPP as in the fast adaptation period.
Example for VO PSAP=1.5 s, N=25, n=3 the PASP=20 ms
If in typical Slow Adaptation Mode, with the same PSAP (Phyrate Slow Adaptation Period) and the same N population, the PASP (Phyrate Adaptation Sampling Period) value is independent of the media, on the contrary of the corresponding Adaptive Sampling Ratio (ASR) which is dependant of the media. ASR is given by ASR=(MIPP/PASP)*(n−1)/n).
Here some examples with a PSAP of 1.5 s:
ASR=66% for a 64 kbps G711 codec with a 20 ms MIPP.
ASR=6% for a 6 mps IPTV with a 1.77 ms MIPP.
ASR=40% for a 512 kbps Videophony with a 12 ms MIPP.
Consequently, in Phyrate Slow Adaptation Mode, sampling is optimized for better IPDT and CUE performances.
The RCA is using the Inter Packet Period measurement for:
The calculation and measurement of Mean Inter-departure Packet Period (MIPP)
The detection of traffic start or traffic resume:
Traffic resume means that the traffic has been suspended during few seconds (e.g. more than 5 s and less than 20 s). In this situation, the system will come back in phyrate fast adaptation mode by re-initiating PFAI counter for a number of iteration specific to each AC.
Traffic start means that the traffic there is no traffic during more than 20 s and the PFAI.
Min and max Traffic Resume Delay values and Traffic Start Delay value are specific to each AC. Best effort traffic.
The MIPP measurement is based on EMA or MEMA method:
In order to identify if the MIPP is lower or not than the PASP, the MIPP EMA value must be initiated with the current PASP value for this AC.
In order to have the same temporal window for all measurement, the smoothing factor and the MEMA factor are the same than those used for sampled phyrate evaluation.
Selection of Sampled Phyrate:
The aim of phyrate sampling is to give an opportunity to the RCA to select a phyrate providing either a better, IPLR, better IPDT or a better CUE usage. This paragraph try to answer to the question about how selecting the phyrate to sample.

First, the RCA should discard the phyrates, which is not able to improve the current targeted performances which are:

The IPLR:

A lower phyrate give lower retry rate and consequently a better IPLR performance. However with some phyrates at the boundary between OFDM and non OFDM should be skipped:
- 5.5 MB provide always a lower retry rate than 6 MB (6 Mbps needs to be skipped if 5.5 is available)
- 11 MB provide always a lower retry rate than 9 MB and 12 Mbs (9 MB and 12 Mb should be skipped if 11 Mbs is available)

The IPDT percentile:

As explain before, there is no way to know the IPDT percentile trend: only measurement or evaluation give a real answer.

However, the RCA should apply the same IPLR exception in the sampling phyrate selection in order to avoid bad GIPLR performance or GIPDT performance.

The CUE:

As explain before, there is no way to know the CUE trend: only measurement or evaluation give a real answer.

However, the RCA should not select a lower phyrate which are consuming even with no retry more CUE that the current phyrate (this is not possible for a higher phyrate).

The RCA should apply the same IPLR exception in the sampling phyrate selection in order to avoid bad GIPLR performance or GIPDT performance.

The simplest method of selection of the sampled phyrates is to choice, the phyrate adjacent with the nominal phyrate:
- 1 upper and 1 lower adjacent phyrate each time is possible
- 1 adjacent lower phyrate if there is no upper rate than the nominal phyrate.
- 1 adjacent high phyrate if there is no lower rate than the nominal phyrate.

To take benefit of the phyrate evolution trend, more sophisticated method may be used for the selection of the sampled phyrate e.g.:

Method providing a faster adaptation but lower reactivity in case of trend inversion:
- 2 adjacent lower phyrates if last phyrate selection has leaded to decrease the nominal phyrate
- 2 adjacent upper phyrates if last phyrate selection has leaded to increased the nominal phyrate
- 1 upper and 1 lower adjacent phyrate if last phyrate selection has leaded to keep the nominal phyrate
- 1 adjacent lower phyrate if there is no available upper rate than the nominal phyrate.
- 1 adjacent higher phyrate if there is no available lower rate than the nominal phyrate.

Method providing a faster adaptation but lower reactivity in case of trend inversion but allowing a easier detection of better phyrate:
- 2 adjacent lower phyrates:
  If last phyrate selection has leaded to decrease the nominal phyrate.
  Or if last phyrate selection has leaded to keep the nominal phyrate when 2 of the sampled phyrates was the 2 higher adjacent phyrates
  Or if there is only one available higher phyrate (e.g. 54 Mbps) than the nominal phyrate 2 adjacent upper phyrates:
  If last phyrate selection has leaded to increased the nominal phyrate
  Or if last phyrate selection has leaded to keep the nominal phyrate when 2 of sampled phyrates was the 2 lower adjacent phyrates;
  Or if there is only one available lower phyrate (e.g. 1 Mbps) than the nominal phyrate;

Method providing a faster adaptation a higher reactivity in case of trend inversion but lower performance for CUE and IPDT due to additional phyrate sampling:
- 2 adjacent lower and 1 upper phyrate:
  If last phyrate selection has leaded to decrease the nominal phyrate
  Or if last phyrate selection has leaded to keep the nominal phyrate when
  2 of the sampled phyrates was the 2 higher adjacent phyrates;
  Or if there is only one available higher phyrate (e.g. 54 Mbps) than the nominal phyrate;
- 2 adjacent upper and 1 lower phyrates:
  If last phyrate selection has leaded to increased the nominal phyrate.
  Or if last phyrate selection has leaded to keep the nominal phyrate when
  2 of the sampled phyrates was the 2 lower adjacent phyrates.
  if there is only one available lower phyrate (e.g. 1 Mbps) than the nominal phyrate;
- 2 adjacent lower phyrates if there is no upper rate than the nominal phyrate (e.g. 54 Mbps).
- 2 adjacent higher phyrates if there is no lower rate than the nominal phyrate (e.g. 1 Mbps).

Etc. . . .

All these methods have benefit and draw back; the RCA may use different methods or a mixing of different for each AC:
- Some methods bringing a faster adaptation are more adapted for mobility needed for VoIP;
- Some methods decreasing the risk of packet lost by limiting the sampling to the next adjacent phyrate;
- Some others optimizing CUE usage are more adapted for BE and BK. However, in the rest of the description of the document, in order to help to the understanding only the simplest method is used.

Assertion Regarding the Impact of the Multi-Rate Mechanism Over Measurement, Evaluation and Performance Results:

As it has been explain before, the principle of multi-rate mechanism is to reduce the phyrate after several tries at the same rate, based on the assumption that the RCA will recover more efficiently a bad situation may by using a lower phyrate.

Regarding mean CUE and Mean IPDT measurement, the principle is to consider that the multi-rate impact over CUE and IPDT measurement should be included in the statistic of the associated packet. Consequently the use of multi-rate:
- Has no impact on retry rate measurement. However the exponential distribution model used to evaluate IPLR may be less relevant.
- Has no impact on IPDT measurement. However the Gamma distribution model used to evaluate IPDT percentile may be less relevant.
- Has an impact in the way to calculate the mean CUE: the CUE time used to transmit one packet is the sum of CUE time of each try taking in account the individual phyrate of the try.

Regarding performance, the use of multi-rate mechanism has some impact in term of performance. This mechanism bring some over quality regarding IPLR and IPDT percentile, but the price to pay is a significant additional CUE consumption due to the more frequent use of lower phyrate especially in a loaded environment.

Successive Packet Lost (SLP) Management:
  Successive Lost Packet (SLP) is a very low latency event indicating that the transmission is currently not possible using this phyrate. There are multiple possible temporary or permanent reasons:
    User Mobility (i.e. out of range station)
    Greater Packet size
    Moving obstacle
    Temporary perturbed environment (e.g. microwaves oven, other WiFi NWs Bluetooth transmission)
    Access point failure (e.g. due to lack of power supply)
    Etc
  However, as there is no way to identify the reasons, there is also no way to know how much time the situation will last, and how to recover properly and efficiently the wireless transmission.
  SLP condition may happen with the use of one specific phyrate or e.g. higher sampled phyrate, on nominal phyrate or on all phyrates: consequently SLP condition must be detected by phyrate.
  Several strategies are possible including some wait and see strategy. However, as the global objective RCA4WMM is QoS, as the main requirement of QoS is to avoid packet lost, the short-term objective of this RCA instance is to look for a working phyrate. Based on the assumption that the detected perturbation is affecting all phyrates, but less the phyrates bellow the phyrate providing the SLP condition, the actions provided on SLP are:
    If the phyrate orignator of the SLP condition is the higher sampled phyrate.
      Stop the current sampling process on the higher phyrate
    If the phyrate originator of the SLP condition is the nominal phyrate or the lower sampled phyrate.
      Select sampled and nominal phyrate bellow the phyrate providing SLP condition.
Starting Phase of a RCA Instance:
  A Starting phase of a RCA instance should be initiated when no traffic has been previously established for this direction and for this AC and this packet range.
  There are several methods to select the initial nominal phyrate for an RCA instance, by order of preference:
    Use the current nominal phyrate of other ACs with the same range of packet size.
    Use the current nominal phyrate of another range of packet size of any AC (greater packet size range are preferred to smaller).
    Use the RSSI value measurement and select one phyrate among basic and operational phyrate supported by the STA and AP.
  Based on initial phyrate value, two phyrates to sample are selected (e.g. 1 adjacent lower and 1 adjacent upper phyrate).
    In addition to the phyrate selection,
    Sampling mode are initiated:
Phyrate Fast Adaptation Iteration (PFAI) counters
Phyrate Adaptive Sampling Period (PASP)
  Measurement and estimation are started:
    Global
      GIPLR estimation based on Mean try rates measurement
      GIPDT percentile estimation based on mean IPDT, IPDT variance
      MIPP
      SPC (Sampling Packet Counter)
    Specific to each phyrate (including sampled phyrates
      IPLR estimation based on Mean try rates measurement
      IPDT percentile estimation based on mean IPDT, IPDT variance PLR
      Mean CUE,
      SLP (successive packet lost)

Learning Phase of a RCA Instance:
  This phase is corresponding to the time needed to send enough packets (e.g. N=25) using nominal and sampled phyrate in order to have a first valid estimation of:
    IPLR, IPDT and CUE of nominal and sampled phyrates.
    GIPLR and GIPDT.
  During this phase:
    If SLP condition is happening, the RCA is managing it as described upper in the document.
    If a packet transmission Resume or Restart condition is happening, it has no impact.
    When the various EMAs or MEMAs measurement are valid (i.e. initiated by the data from N packets), then the RCA instance is coming in adaptive phase.
Fast and Slow Adaptive Phase of a RCA Instance:
  This adaptive phase is the normal working phase for the RCA. In this phase, the sampling method in use (for fast or slow adaptation) is indicated by the FPAI counter and of the MIPP.
  During this phase, the nominal phyrate change may happen on these following events:
    On SLP (Successive packet lost) condition (as explain previously in the document).
    On GIPLR state change from good to bad state in all GIPDT states.
    On GIPDT state change from good to bad state when GIPLR is in Good state.
    On re-starting condition (as explain previously in the document).
    When the RCA has a new packet to transmit and all IPLR, IPDT and CUE estimation of sampled and nominal phyrates are in a Valid State (indicated by the SPC), i.e. the various used MEMA have been fed by a sufficient number of samples.
  IF IPLR, IPDT percentile and CUE estimation are valid, and if RCA have a new packet to transmit, nominal phyrate change may happen management in relation with the current GIPL and GIPDT state:
    If the GIPLR is Bad state (i.e. GIPLR>maxIPLR), the RCA will choose a lower phyrate for nominal and sampled phyrate whatever could be the individual IPLR performance of each phyrate. If there is no lower phyrate available, the RCA may only wait for better conditions.
    The lowest phyrate will become the new nominal phyrate.
    The highest sampled phyrate is deselected.
    The RCA is selecting a new phyrate to sample (e.g. a lower phyrate than the new current phyrate). If there is no lower phyrate available to sample, the RCA only sample on phyrate.
    The EMAs of the new sampled Phyrates are initiated with the EMAS values of the new current phyrate.
    If the GILPR is in Good state (i.e. GIPLR<maxIPLR) but GIPDT in Bad state (i.e. GIPDT percentile>max IPDT), the RCA will choose the phyrate providing the best IPDT.
    If it is already the nominal phyrate, the RCA may only wait for better IPDT performance.
    If it one of the sampled phyrate, the RCA verify that this IPLR evaluation fulfill the max IPLR requirement,
    If not, the RCA may only wait for better performance
    If yes, the best-sampled phyrate (e.g. the lowest phyrate) will become the new nominal phyrate.
    One of the previously sampled phyrate (e.g. the highest phyrate) is deselected The RCA is selecting a new phyrate to sample (e.g. a lower phyrate than the new current phyrate). The EMAs of the new sampled Phyrates are initiated with the EMAS values of the new current phyrate.

If the GILPR is in Good state (i.e. GIPLR<maxIPLR) and if also GIPDT in Good state (i.e. GIPDT percentile<max IPDT), the RCA will choose the phyrate providing the best CUE.

If it is already the nominal phyrate, the RCA may only wait for better conditions.

If it is one of the sampled phyrate (e.g. th highest phyrate);

The RCA will verify that the IPLR and IPDT percentile evaluation are bellow the Max IPLR and IPDT percentile requirement of this AC:.

If not, the RCA may only wait for better conditions

If yes, this phyrate will become the new nominal phyrate.

One of the previously sampled phyrate (e.g. the lowest phyrate) is deselected

The RCA is selecting a new phyrate to sample (e.g. a highest phyrate than the new current phyrate). The EMAs of the new sampled Phyrates are initiated with the EMAS values of the new current phyrate.

In order to improve convergence time of various MEMA, all EMA should be to be initiated at starting phase to consistent value (i.e. probable value), after the learning phase various EMA should be initiated with inherited values provided by in use sampled or nominal phyrate.

Depending of the AC requirement, the most difficult requirement may be the max IPLR or max IPDT requirement, this implicitly means, that if the requirements are not realistic for a WiFi NW, the RCA will be not able to satisfy all of them.

A too small Excessive Retry Number, may lead to an unreachable max IPLR.

Exponential Distribution model for IPLR and Gamma distribution model a reliable to compare phyrate performance but a less reliable regarding the provided IPLR and IPDT estimation. A too small max IPLR requirement (e.g. bellow 0.05%) or a too high percentile for max IPDT requirement (e.g. above 99.9%) may lead to non realistic estimation and will imply very small smoothing factor for the MEMA and consequently a very bad reactivity to changing condition.

Summary of WiFi Data and Various Information Used by RCA4WMM:

RCA is using several data reflecting the configuration and input providing from Wireless implementation:
  RSSI signal level for this direction, this value is used by the RCA to decide of the initial phyrate.
  Long or short preamble mode (used for CUE calculation)
  Long or short slot time (used for CUE calculation)
  Basic and operational phyrate (used for CUE calculation and to decide which phyrate need to be sample)
  Current AC information
  Curent AC (VI, VO, BI BK)
  WMM parameters (AIFS, CW MIN, CWMAX, TXOP) values.
  Targeted Max IPLR value.
  Targeted Max IPDT value.
  Phyrate Slow Adaptation Period (PSAP) value.
  Phyrate Fast Adaptation Iteration (PFAI) number on traffic starting.
  Phyrate Fast Adaptation Iteration (PFAI) numbers on traffic resume.
  Max successive packet lost number.
  Consistent Smoothing factor and MEMA factor for low and fast sampling measurement and global measurement.
  Multi-rate Retry Number (MRN) and Excessive Retry Number (ERN).
  Traffic starting period value.
  Min and max traffic resume period value.
  Specific data associated Phyrate Sampling mode and parameter (associated to each packet range. instance):
    Mean Inter-departure Packet Period (MIPP).
    Phyrate Fast Adaptation Iteration (PFAI) counters.
  Phyrate Adaptive Sampling Period (PASP) and associated sampling timer.
  Nominal and Sampled phyrates.
  Last send frame info, this include (associated to each packet range instance)/
  Send/unsent: (used for GIPLR statistic).
  Current Phyrate (used for mean CUE calculation).
  Number of tries (used for IPLR and Mean CUE calculation).
  Packet Size (used for Mean CUE calculation).
  Transmission Delay including all tries, back off times, and waiting for free channel time (used for sampled phyrate IPDT and GIPDT estimation).
  Specific Data for global measurement and estimation (associated to each packet range instance):
    Mean GIPDT, and GIPDT variance, GIPDT percentile estimation.
    Global mean Try rate and GIPLR estimation.
    Counter of sample indicating the valid state of the measurement and estimation.
  Specific data for each sampled or nominal phyrate (associated to each packet range instance):
  Phyrate value/
  Mean IPDT, and IPDT variance, IPDT percentile estimation.
  Mean Try rate and IPLR estimation.
  Mean CUE measurement.
  Sampling Packet Counter (SPC) indicating when of the measurement and estimation of IPLR, IPDT percentile, and CUE have been fed by enough packet data to be considered as valid.
  Current Successive Packet Lost (SLP) counter.

RCA4 WMM Implementation Profile Examples for Various Devices:

Depending of the device several implementations profiles of the invention should be considered:
  Generic WiFi Access Point
  WiFi Phone ((including use in the fix mobile convergence context)
  WiFi Videophone (including use in the fix mobile convergence context)
  WiFi IPSTB
  PC/PDA A generic Access Point should cover any type of application, so the AP should implement a full implementation of the RC4WMM algorithm on order to cover the various types of application. In addition, specific configurations need to be proposed to cover the situation where WMM mode is deactivated. For that the AP may propose in its configuration user interface alternative profiles e.g. one bandwidth oriented and the other one real time media oriented:
  For the bandwidth oriented profile, the RCA4WMM parameter set of BE/BK class AC should be considered as optimum.

For the real time oriented profile, the RCA4WMM parameter set of VI class AC with may be a max IPDT value extended to around 100 ms AC should be considered as a kind of compromise between a real-time media and bandwidth oriented objective A WiFi phone is a device with constraints regarding memory footprint and CPU usage, so there is a need to provide simple RCA targeting adapted IPLR and IPDT percentile for voice media, good IPLR for signaling, long range, mobility and quick adaptation. A WiFi phone is using two ACs:

BE AC: for TCP or UDP based protocol such as DHCP, SIP, DNS, HTPP, etc used essentially for signaling and occasionally for data transfer.

VO AC: for VoIP and various Fix (or variable bit rate) codec.

Consequently, a RCA for WiFi phone should support:
One RCA instance for BE and one VO AC
Optionally multi-rate support for mobility purpose
Phyrate Fast adaptation mode, as the bandwidth use is quite low, slow adaptation mode support may be considered as optional
global and by phyrate IPLR and IPDT percentile estimation
Successive packet lost management A WiFi videophone is a device witch add to the RCA the interactive video constraint to previous VoIP constraints:

VI AC: for RTP and RTCP. The Video stream is between 64 kbps and 512 kps. The RTCP packet is significantly smaller compared to Video Packet Consequently, the RCA for WiFi Videophone should support:
One RCA instance for BE AC and one VO AC.
Two RCA instances for VI AC (RTP and RTCP).
Optionally Multi-rate support for mobility purpose.
Phyrate Fast and low adaptation mode, as the bandwidth use is quite low, slow adaptation mode is required for interactive video.
Mean IPDT optimization for VI, VO and BE AC.
Successive packet lost management.

A WiFi STB with storage capability is a device which should be considered both as an AV player or content server of in the networked house. Content may include NV content but also images, HTML page. It may provide also V2IP and Videophony. For this type of environment the support of direct link mode should be considered as a mandatory or at least as a nice to have feature.

As the NV server application like IPTV or VOD, need a large percent of available CUE, there is a real benefit to save the CUE for others application. For this type of application, the use of adaptive sampling allows to reduce the CUE usage need for sampling.

Because IP, STB and AP are not a mobile device, there is no need and, even more, it is not recommended activating the multi-rate mechanism. Consequently, for this type of device, a full implementation of the algorithm is needed is for this type of device.

PCs or PDAs are both generic and multipurpose devices, so for this type of device it's difficult to avoid a full implementation of the RC4.

The main benefit of this invention at user level is to provide for application like VoIP, V2IP, IP TV, and VOD using WiFi NW a phyrate selection targeting the specific QoS requirements of not only interactive and non interactive real time media but also best effort traffic.

As the QoS requirements may be specified for each AC, the phyrate selection criteria's are also specific for each AC. As long as the QoS requirements may be satisfied the RCA4WMM will have the same behavior than a bandwidth oriented RCA. Consequently, the global performance of the WiFi NW will be optimum and adapted to each type of real time and non real time content.

In addition, by providing a specific management per AC adapted to VO or VI media, the RCA4WMM is avoiding all difficult compromise and improve the performance. Compared to a bandwidth oriented RCA, RCA4WMM, the phyrate selection for the BE and BK AC will provided more bandwidth performance due to adaptive sampling mechanism, needed by HTML browsing or DATA bulk transfer and will not be degraded by other contents requesting QoS performance like VoIP or IPTV and vice versa.

Additional benefits may be found regarding the adaptation to various environment and usages:

This invention may be used in non WMM configuration. In this situation, the RCA parameter configuration selected will be either a BE AC configuration.

This invention may be implemented as well on a WiFi Access Point than on WiFi Station. The maximum of benefit is provided when it-is implemented on both AP and STAs. It fully compatible with the existing IEEE 802.11 standard and may apply as to all implementation of WMM over 802.11a, b, g and following.

This invention is HW independent. It may be built over any HW implementation, which is able to provide the needed information to the SW.

This invention is independent of the performance of the HW: but the global resulting performances in term of e.g. range or bandwidth are clearly dependant of the HW and all other WiFi implementation belonging to the same NW.

This invention is also independent of various WiFi parameter, and configuration, like short and long preamble, short and long slot time, basic and operational data rates, etc even if all these parameters have an impact over the CUE and IPDT performance and the selected rate.

This invention is independent of the WMM parameter set (AIFS, CWMIN, CWMAX, TXOP even if all these parameters have an impact over the CUE and IPDT performance and over the selected rate.

This invention is also compatible with PSD and APSD mechanism.

| Glossary | |
|---|---|
| AC | Access Category |
| AIFS | arbitration inter-frame space |
| AP | Access Point |
| BE | Best Effort |
| BER | Bit error Ratio |
| BERR | BERR retry rate |
| BK | Background |
| CRR | Collision retry rate |
| CUE | Channel Usage Estimation |
| CW | Contention Window |
| EDCA | Enhanced distributed channel access |
| EIFS | extended inter-frame space (EIFS) |
| EMA | Exponential moving average |
| ERN | Excessive retry number |
| GIPDT | Global IPDT |
| GIPLR | Global IPLR |
| HW level | Hardware level |
| IP | Internet Protocoll |
| IPDT | IP delay Transmission |
| ITU | International Telecommunication Union |
| IPLR | IP packet lost ratio |
| MAC | Medium Access Control |

| | Glossary |
|---|---|
| MEMA | Multiple EMA |
| MIPP | Mean interdeparture packet period |
| NW | Network level |
| PFAI | Phyrate fast adaptation iteration |
| POH | Phy overlead delay |
| PSAP | Phyrate slow adaptation period |
| QOS | Quality of service |
| RCA | Rate control algorithm |
| RR | Retry Rate |
| RTCP | Real-time Transport Control Protocol |
| RTP | Receiver transport protocol |
| SLP | Sucessive packet loss |
| SMA | Sliding moving average |
| STA | Station |
| TCP | Transmission control protokoll |
| TXOP | Transmit Opportunity |
| UDP | User Datagram Protocol |
| VI | Video |
| VO | Voice |
| WMM | WiFi Multimedia |
| WME | Wireless Multimedia extension |

The invention claimed is:

1. A method to select a physical layer transmission rate in a Wireless Multimedia, WMM, environment, said environment prioritizing transmission traffic from at least a station, STA, or an access point, AP, to at least a station, STA, or an access point, AP, using different access categories, AC, wherein different packet sizes correspond to the transmission traffic types from a station, STA, or an access point, AP; said method comprising the steps of:
   determining parameters specific for each access category, AC, and within an access category, AC, for each packet size; and
   selecting a physical layer transmission rate using said parameters for each one of said access category, AC, and packet size, wherein the parameters specific for each access category, AC, and within an access category, AC, are the specific values Multi-rate Retry Number, MRN, and Excessive Retry Number, ERN, of each AC.

2. Method to select a physical rate as claimed in claim 1, wherein, the parameters specific for each access category, AC, are quality of service criteria, QoS, and Channel Usage Estimation, CUE, used by each AP or STA.

3. Method to select a physical rate as claimed in claim 2, wherein, the quality of service criteria, QoS, are Packet Loss Ratio criteria, IPLR, or delay transmission criteria, IPDT.

4. Method to select a physical rate as claimed in claim 3, wherein the selection is dynamic in order to change from one physical rate to another physical rate when the quality of service criteria, QoS, are changing.

5. Method to select a physical rate as claimed in claim 3 wherein to provide an estimation of packet Lost Ratio, IPLR, based on the mathematic properties of an Erlang or an Exponential distribution model of Retry Number needed for the transmission of a packet within the same AC.

6. Method to select a physical rate as claimed in claim 3 wherein the measurement of the transmission delay of each packet, IPDT, is being defined with starting and ending conditions, the starting condition corresponding to the end of the filling up of the transmit buffer of the corresponding access category, AC, or station, STA, with a new packet to be transmitted, the ending condition corresponding to the reception of a acknowledgement packet, ACK.

7. Method to select a physical rate as claimed in claim 3 wherein the Quality criteria, QoS, for each Access Category, AC, are percentile measured.

8. Method to select a physical rate as claimed in claim 3, wherein providing an estimation of IP packet Delay Transmission, IPDT, percentile using the mathematical properties of a Gamma distribution model of the IP packet Delay Transmission, IPDT, in which the main inputs are the packet Delay Transmission, IPDT, mean and the packet Delay Transmission, IPDT, variance of each packet.

* * * * *